Patented Aug. 22, 1933

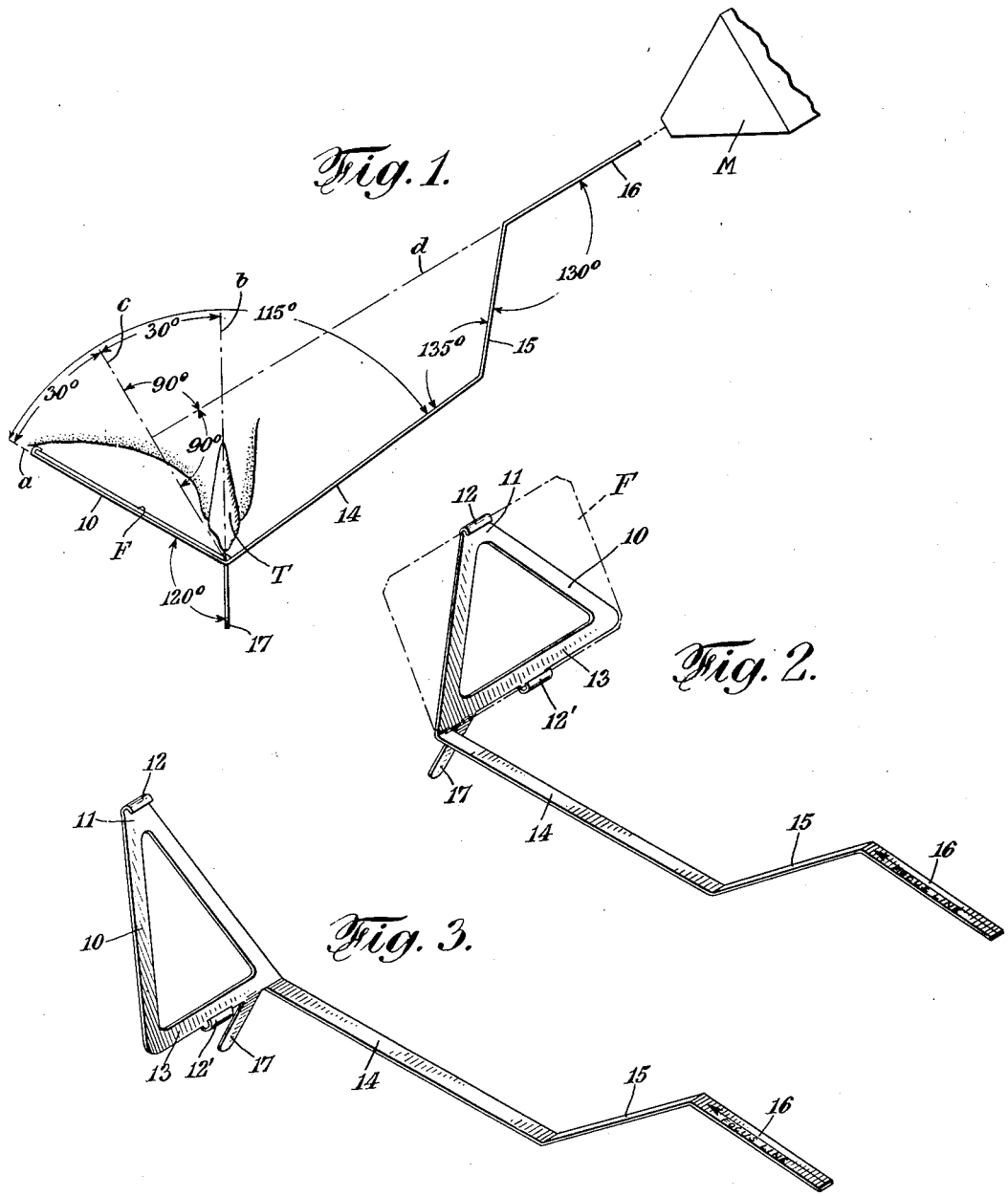

1,923,669

UNITED STATES PATENT OFFICE 1,923,669

DENTAL X-RAY FOCUSING INSTRUMENT

Henry H. Harrison, New York, N. Y.

Application August 22, 1932. Serial No. 629,782

4 Claims. (Cl. 250—34)

This invention relates to radiant energy apparatus, and more particularly to an instrument for holding a photographic film while being exposed to actinic rays derived from powerful electrical apparatus, known as Roentgen or X-ray machines, with special reference to taking photographs of teeth in the profession of dentistry.

In taking X-ray pictures of a tooth to determine its condition, the sensitized film as entered in the mouth must necessarily be placed at an angle with the tooth, due to the curved contour of the interior of the mouth, and this angle varies in accordance with the anatomical structure of the region in which the tooth is located.

In order to obtain an accurate sciagraph of a tooth free from distortion, an operator must compensate this angle by directing the actinic rays at right angles to a target representing an imaginary plane bisecting the angle between the film and axis of the tooth undergoing investigation.

An experienced operator, using the utmost care, can never be certain, under the circumstances, of obtaining accurate results, as there is no presently known method of exactly determining the correct angle at which the rays should be directed.

Having these matters in mind it has been an object of the present invention to provide a device by the use of which an X-ray dental film may be properly positioned with reference to any particular tooth, and retained in such adjustment during exposure to the rays that distortion, elongation, foreshortening, etc., etc., are eliminated.

A further feature is in the provision of means whereby the correct angle of ray penetration is mechanically determined, irrespective of the position of the tooth, and the rays directed at a right angle to a median plane between the center line of the tooth and the film.

Another purpose is to produce an extremely simple instrument for attaining the foregoing results, the instrument being easy to apply and effective in operation.

These important objects are accomplished by the novel construction, combination and arrangement of parts hereinafter described and illustrated in the accompanying drawing, constituting a material component of this disclosure, and in which:—

Figure 1 is a side elevational view of an embodiment of an implement made in accordance with the invention, indicating its application.

Figure 2 is a perspective view of one form of the implement showing a conventional type of film held therein.

Figure 3 is a similar perspective view of another form of the device.

It is to be understood that these instruments are preferably furnished in sets, differing from one another only in shape for respective positions which they assume in the mouth, as for the upper left and lower right posterior regions, the upper right and lower left regions, upper left and lower right anterior regions, and for the upper right and lower left anterior regions of the mouth.

Each individual instrument consists of a frame 10, which by preference is shown as generally triangular, but obviously may be of any other suitable shape, its upper edge or apex 11 having an inturned clip 12, while centrally on the lower edge or base 13 is a similar but reversely turned clip 12', these parts together constituting a holder for a film-pack F.

Extending from one end of the base 13, at an angle of approximately 115 degrees, is a bar 14 having a member 15 raised at an angle of 135 degrees, acting as a connector for the focus directing arm 16 which extends from the connecting member 15 at an angle of 130 degrees.

Adjacent the bar 14 is a short stabilizer lug 17 disposed at an angle of 120 degrees with reference to the holder 10 and adapted to be held by the fingers in adjusting and retaining the instrument in the mouth, the correct position of the stabilizer being in direct alinement with the longitudinal center line of the tooth; all these several parts are of integral construction, preferably of thin but rigid non-tarnishable metal.

A dental film F of any standard type is inserted between the flat face of the frame 10 and clips 12—12' and placed in the mouth. The edges of the frame and film rest against the tissues at the roof of the mouth and end of the tooth as seen diagrammatically in Fig. 1, in which position the plane $a$ of the film is 60 degrees from the axis or center line $b$ of the tooth T.

As is well known a correct image of the tooth can only be obtained when the light rays from the machine M are focused on a plane $c$ half way between these points, ordinarily 30 degrees from the film and tooth, and the rays strike the plane bisecting these angles, squarely at an angle of 90 degrees along the line $d$, which corresponds with the plane of the focus finding arm 16 and by which the rays should be guided.

To understand exactly what this instrument does and how it does it, it will be useful to describe the operation of taking a dental Roentgenogram at the present time.

The operator puts the X-ray film in the patient's mouth opposite the tooth to be X-rayed, directing the patient to press against the film with the thumb in order to hold the film in position.

When this is done, the film is bent and distorted; and, inasmuch as a Roentgenogram is really a shadow picture, it can readily be seen that when the shadow of a tooth is thrown on a bent or distorted surface, the shadow will necessarily also be distorted.

It should also be noted that when film is placed in the mouth, anatomical conditions cause the film to assume a position at an angle away from the tooth to be X-rayed; this angle varying in the different positions of the mouth.

The operator is aware of the existence of this angle. He knows that he will elongate or foreshorten the shadow picture if he uses the tooth or the film as his target for the X-ray. He therefore endeavors to find an imaginary line half way between the tooth and the film, and uses this as his target for the X-ray.

But, owing to the variations in angles formed in different mouths, and in different positions in the same mouth, it can readily be seen that the focusing of the X-ray is dependent entirely on guess-work; and as a result of this, Roentgenograms are produced, even by competent men, which are either elongated, foreshortened, or distorted in various ways, sufficiently to render the Roentgenogram almost useless to one who strives for exactness in his work.

By reason of the angulation of this instrument, as will be seen in the drawing, an X-ray directed against the tooth to be examined, parallel to the focus directing arm, will strike squarely at the imaginary line or target and assume a perfect focus.

From the foregoing it will be seen that the device constitutes a very efficient aid, not only in positioning and retaining the film, but also in directing the rays, causing them to properly focus and produce accurate images free from distortion.

Also from the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. A dental film pack holder comprising an open triangular frame having hook clips at its apex and base, a rigid focusing arm reaching from the base of said frame at a definite angle thereto, and a stabilizer on said frame adjacent said arm.

2. A dental film pack holder comprising a triangular frame having hook clips at its apex and base, and a focusing arm rigid with the base and extending therefrom at an approximate angle of 115 degrees with the base.

3. A dental film pack holder comprising a triangular frame having hook clips at its apex and base, a focusing arm on the base of said frame extending at an angle of approximately 115 degrees from the plane of the frame, and a stabilizer extending from the base of said frame at an angle bisecting the angle of said arm and plane of said frame, all of said elements being integral.

4. A dental film pack holder comprising a triangular frame provided with pack retaining clips, a focusing arm, and a stabilizer, said arm and stabilizer being rigid with said frame and fixed at an angle of approximately 115 degrees from one another.

HENRY H. HARRISON.